(12) United States Patent
Salomäki

(10) Patent No.: US 7,084,604 B2
(45) Date of Patent: Aug. 1, 2006

(54) SPEED SENSORLESS CONTROL OF AN INDUCTION MACHINE USING A PWM INVERTER WITH OUTPUT LC FILTER

(75) Inventor: Janne Salomäki, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/222,180

(22) Filed: Sep. 9, 2005

(65) Prior Publication Data

US 2006/0145650 A1 Jul. 6, 2006

(30) Foreign Application Priority Data

Sep. 9, 2004 (EP) .................................. 04104340

(51) Int. Cl.
*H02P 23/12* (2006.01)
(52) U.S. Cl. .................... 318/811; 318/800; 318/810; 318/807; 318/767; 363/34; 363/37; 363/39
(58) Field of Classification Search .................... None
See application file for complete search history.

(56) References Cited

U.S. PATENT DOCUMENTS

| | | | |
|---|---|---|---|
| 5,513,090 A * | 4/1996 | Bhattacharya et al. | ......... 363/40 |
| 5,646,498 A * | 7/1997 | Lipo et al. | .................. 318/800 |
| 5,661,390 A * | 8/1997 | Lipo et al. | .................. 318/803 |
| 5,670,851 A * | 9/1997 | Numazaki | .................... 318/106 |
| 5,686,806 A * | 11/1997 | Hibbard | ....................... 318/800 |
| 5,831,842 A * | 11/1998 | Ogasawara et al. | ........... 363/40 |
| 5,962,996 A * | 10/1999 | Goto et al. | ...................... 318/4 |
| 5,999,423 A * | 12/1999 | Steinke et al. | .................. 363/40 |
| 6,122,184 A * | 9/2000 | Enjeti et al. | .................... 363/47 |
| 6,208,537 B1 * | 3/2001 | Skibinski et al. | ............. 363/40 |
| 6,388,904 B1 * | 5/2002 | Nomura | ........................ 363/71 |
| 6,452,819 B1 * | 9/2002 | Wobben | ........................ 363/40 |
| 6,965,212 B1 * | 11/2005 | Wang et al. | ................. 318/700 |
| 6,985,371 B1 * | 1/2006 | Talja et al. | ..................... 363/40 |
| 2004/0084229 A1 * | 5/2004 | Stancu et al. | ............... 180/65.1 |
| 2005/0141248 A1 * | 6/2005 | Mazumder et al. | ........... 363/39 |
| 2005/0174812 A1 * | 8/2005 | Wu | .............................. 363/39 |

OTHER PUBLICATIONS

A novel control strategy for high-power high-performance AC power supplies, Lu Jialin; Su Yanmin;□□Industrial Electronics Society, 2001. IECON '01. The 27th Annual Conference of the IEEE vol. 2, Nov. 29-Dec. 2, 2001 pp. 1178-1183 vol. 2 □□.*

(Continued)

Primary Examiner—Rina Duda
Assistant Examiner—Robert W. Horn
(74) Attorney, Agent, or Firm—Buchanan Ingersoll PC

(57) ABSTRACT

A method of controlling of an induction machine using an inverter is disclosed with output LC filter. The method includes determining an inverter output current vector ($\underline{i}_A$), determining an inverter output voltage vector ($\underline{u}_A$), and forming a full-order observer having a system matrix ($\hat{A}$) and gain vector ($\underline{K}$). The observer produces an estimated rotor flux linkage vector ($\hat{\psi}_R$), an estimated stator current vector ($\hat{\underline{i}}_s$), an estimated stator voltage vector ($\hat{\underline{u}}_s$) and an estimated inverter output current vector ($\hat{\underline{i}}_A$). An estimation error ($\underline{i}_A - \hat{\underline{i}}_A$) of the inverter output current vector is determined, and a speed adaptation law is formed based on the estimation error of the inverter output current vector for determining an estimate for electrical angular speed ($\hat{\omega}_m$) of the induction machine. The induction machine is controlled based on the produced estimates and a measured inverter output current.

4 Claims, 5 Drawing Sheets

OTHER PUBLICATIONS

Novel vector control system using deadbeat-controlled PWM inverter with output LC filter,Kojima, M.; Hirabayashi, K.; Kawabata, Y.; Ejiogu, E.C.; Kawabata, T.; Industry Applications, IEEE Transactions on vol. 40, Issue 1, Jan.-Feb. 2004 pp. 162-169.*

*Doyle F. Busse et al., "The Effects of PWM Voltage Source Inverters on the Mechanical Performance of Rolling Bearings", IEEE Transactions on Industry Applications, vol. 33, No. 2, Mar./Apr. 1997, pp. 567-576.

*A. Von Jouanne et al., "The Effect of Long Motor Leads on PWM Inverter Fed AC Motor Drive Systems", IEEE, 1995, pp. 592-597.

*Mari Kojima et al., "Novel Vector Control System Using Deadbeat-Controlled PWM Inverter With Output LC Filter", IEEE Transactions on Industry Applications, vol. 40, No. 1, Jan./Feb. 2004, pp. 162-169.

*Akira Nabae et al., "A Novel Control Strategy of the Inverter With Sinusoidal Voltage and Current Outputs", IEEE, 1994, pp. 154-159.

*Robert Seliga et al., "Multiloop Feedback Control Strategy in Sine-Wave Voltage Inverter For An Adjustable Speed Cage Induction Motor Drive System", EPE, 2001—Graz, pp. 1-9.

*Janne Salomaki et al., "Vector Control of an Induction Motor Fed by a PWM Inverter With Output LC Filter", the authors are with Heisinki Univeristy of Technology, Power Electronics Laboratory, Finland, pp. 1-6.

*Hisao Kubota et al., :DSP-Based Speed Adaptive Flux Observer of Induction Motor, IEEE, 1993, pp. 344-348.

*Hisao Kubota, "Regenerating-Mode Low-Speed Operation of Sensorless Induction Motor Drive With Adaptive Observer", IEEE Transactions on Industry Applications, vol. 38, No. 4, Jul./Aug. 2002, pp. 1081-1086.

*Marko Hinkkanen, et al. "Stabilization of the Regenerating Mode of Full-Order Flux Observers for Sensorless Induction Motors", IEEE, 2003, pp. 145-150.

*Gordon R. Slemon, "Modelling of Induction Machines for Electric Drives", IEEE Transactions on Industry Applications, vol. 25, No. 6, Nov./Dec. 1989, pp. 1126-1131.

*Masaru Hasegawa et al., "Robust Adaptive Full-Order Observer Design With Novel Adaptive Scheme For Speed Sensorless Vector Controlled Induction Motors", IEEE, 2002, pp. 83-88.

*Jouko Niiranen, "Fast and Accurate Symmetric Euler Algorithm For Electromechanical Simulations", 6$^{th}$ Int. Conf. Electrimacs' 99, Sep. 14-16, 1999, Lisboa, Portugal, Preceedings vol. 1, pp. 71-78.

*Juergen K. Steinke et al., "Use of a LC Filter to Achieve a Motorfriendly Performance of the PWM Voltage Source Inverter", IEEE, 1997, pp. 1-3.

*Chen Xiyou et al., "The Engineering Design and Optimisation of Inverter Output RLC Filter in AC Motor Drive System", IEEE, 2002, pp. 175-180.

*John K. Pedersen et al., "An Ideal PWM-VSI Inverter With Feedforward and Feedback Compensation", The European Power Electronics Association, 1993, pp. 501-507.

*Janne Salomaki et al., "Vector Control of an Induction Motor Fed by a PWM Inverter with Output LC FILTER", Proc. Norpie 2004, Jun. 2004, pp. 1-6, Trondheim, Norway.

*Hinkkanen M. et al., "Stabilization of the Regenerating Mode of Full-Order Flux Observers for Sensorless Induction Motors", IEEE, vol. 1, Jun. 1, 2003, pp. 145-150, New Jersey, USA.

*European Search Report dated Feb. 23, 2005.

* cited by examiner (a)                    (b)

even when LC filter is used in the inverter output. With the method of the invention the benefits achieved with the inverter output LC filter can be utilized in connection with a drive that uses no additional measurement or feedback signals.

SPEED SENSORLESS CONTROL OF AN INDUCTION MACHINE USING A PWM INVERTER WITH OUTPUT LC FILTER

This application claims priority under 35 USC § 119 to EP Patent Application No. 04104340.7, the disclosure of which is hereby incorporated by reference in its entirety.

FIELD OF THE INVENTION

This invention relates to a speed sensorless control method for an induction motor that is supplied by a PWM inverter through an output LC filter.

BACKGROUND OF THE INVENTION

A voltage source PWM inverter enables stepless speed and torque control of AC motors, allowing reduced energy consumption and increased control performance. The use of a PWM inverter, however, not only brings advantages but also causes unwanted effects in the motor. The output voltage of the inverter consists of sharp-edged voltage pulses, producing bearing currents and high voltage stresses in motor insulations [1], [2]. The oscillation at the switching frequency causes additional losses and acoustic noise. These phenomena can be eliminated by adding an LC filter to the output of the PWM inverter. In addition, the EMI shielding of the motor cable may be avoided if the voltage is nearly sinusoidal.

Adding an LC filter to a variable speed drive makes the motor control more difficult. Usually, a simple volts-per-hertz control method is chosen. Better control performance is achieved by using vector control, i.e. field oriented control. However, there are only few publications that deal with the vector control of a motor fed through an LC filter [3]–[5]. In these papers, an extra current or voltage measurement was necessary, and a speed encoder was used. In order to obtain cost savings and reliability improvements, a full-order observer was proposed in [6], making additional current or voltage measurements unnecessary.

Recently, the speed sensorless control of ac motors has become popular. Promising estimation methods for speed sensorless induction motor drives are speed-adaptive full-order observers [7] combined with improvements in regeneration mode operation [8], [9]. However, a speed sensorless control methods for induction motor supplied through an LC filter are not yet published.

A problem associated with the prior art control systems with an output filter is the need for either the measurements of current or voltage from the motor or the use of speed encoders. Both of the above solutions can increase costs both for installation and maintenance on the system.

BRIEF DESCRIPTION OF THE INVENTION

An exemplary method disclosed herein is based on the use of an adaptive full-order observer, and no additional voltage, current or speed measurements are needed for the vector control of the motor. The rotor speed adaptation is based on the estimation error of the inverter current. The rotor speed adaptation can be based on the measured inverter current due to the surprisingly noticed fact, that the quadrature components of the inverter current and the stator current are almost identical, i.e. the applied LC filter does not distort the q component of the current.

An exemplary advantage of the method is that the induction motor can be controlled without any additional measurements even when LC filter is used in the inverter output. With the method of the invention the benefits achieved with the inverter output LC filter can be utilized in connection with a drive that uses no additional measurement or feedback signals.

This can be achieved by using a speed-adaptive observer, which is extended for the induction motor drive equipped with an LC filter, resulting in a drive where only the inverter output current and dc-link voltage are measured. A simple observer gain is used, and a speed-adaptation law basing on the estimation error of the inverter current is employed. The regeneration mode operation at low speeds is further stabilized by modifying the speed adaptation law. The vector control of the motor described in the specification is based on nested control loops.

BRIEF DESCRIPTION OF THE DRAWINGS

In the following the invention will be described in greater detail by means of preferred embodiments with reference to the attached drawings, in which.

DETAILED DESCRIPTION OF THE INVENTION

In the following first the system model and control are explained. Then attention is given to dynamic analysis of the system and simulation and experimental results are also described.

System Model and Control

Figure 1:
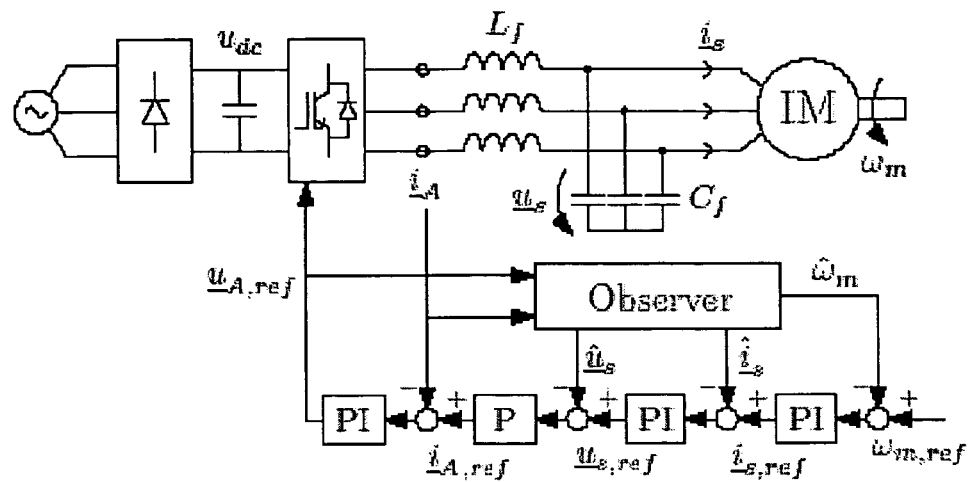
FIG. 1 shows a principle of the exemplary control system.

A principle of the control system is shown in FIG. 1. The inverter output voltage $\underline{u}_A$ is filtered by an LC filter, and the induction motor (IM) is fed by the filtered voltage $\underline{u}_s$. The inverter output current $\underline{i}_A$ and the dc link voltage $u_{dc}$ are the only measured quantities, whereas the stator voltage $\underline{u}_s$, stator current $\underline{i}_s$, and the electrical angular speed $\omega_m$ of the rotor are estimated by an observer (the estimated quantities being marked by '^'). The system is controlled by nested control loops in estimated rotor flux reference frame. It should be noted that the control arrangement presented is only one example of suitable control.

A. Filter and Motor Models

In a reference frame rotating at angular frequency $\omega_s$, the equations for the LC filter are $$\frac{d\underline{i}_A}{dt} = -j\omega_s \underline{i}_A - \frac{R_{Lf}}{L_f}\underline{i}_A + \frac{1}{L_f}(\underline{u}_A - \underline{u}_s) \qquad (1)$$

$$\frac{du_s}{dt} = -j\omega_s u_s + \frac{1}{C_f}(i_A - i_s) \quad (2)$$

where $L_f$ is the inductance and $R_{Lf}$ the series resistance of the inductor, and $C_f$ is the capacitance of the filter.

The motor model is based on the inverse-Γ model [10] of the induction motor. The stator and rotor voltage equations are $$u_s = R_s i_s + \frac{d\psi_s}{dt} + j\omega_s \psi_s \quad (3)$$

$$0 = R_R i_R + \frac{d\psi_R}{dt} + j(\omega_s - \omega_m)\psi_R \quad (4)$$

respectively, where $R_s$ and $R_R$ are the stator and rotor resistances, respectively, and $i_R$ is the rotor current. The stator and rotor flux linkages are $$\psi_s = (L'_s + L_M)i_s + L_M i_R \quad (5)$$

$$\psi_R = L_M(i_s + i_R) \quad (6)$$

respectively, where $L'_s$ denotes the stator transient inductance and $L_M$ is the magnetizing inductance. Based on (1)–(6), the state-space representation of the system can be written as shown in (7) and (8).

$$\dot{x} = \begin{bmatrix} -\frac{R_{Lf}}{L_f} - j\omega_s & -\frac{1}{L_f} & 0 & 0 \\ \frac{1}{C_f} & -j\omega_s & -\frac{1}{C_f} & 0 \\ 0 & \frac{1}{L'_s} & -\frac{1}{\tau'_\sigma} - j\omega_s & \frac{1}{L'_s}\left(\frac{1}{\tau_r} - j\omega_m\right) \\ 0 & 0 & R_R & -\frac{1}{\tau_r} - j(\omega_s - \omega_m) \end{bmatrix}_{\tilde{A}} x + \begin{pmatrix} \frac{1}{L_f} \\ 0 \\ 0 \\ 0 \end{pmatrix}_B u_A \quad (7)$$

$$i_A = \underbrace{[1\ 0\ 0\ 0]}_{C} x \quad (8)$$

The state vector is $x = [i_A\ u_s\ i_s\ \psi_R]^T$, and the two time constants are defined as $\tau'_\sigma = L'_s/(R_s + R_R)$ and $\tau_r = L_M/R_R$.

B. Cascade Control

Figure 2:
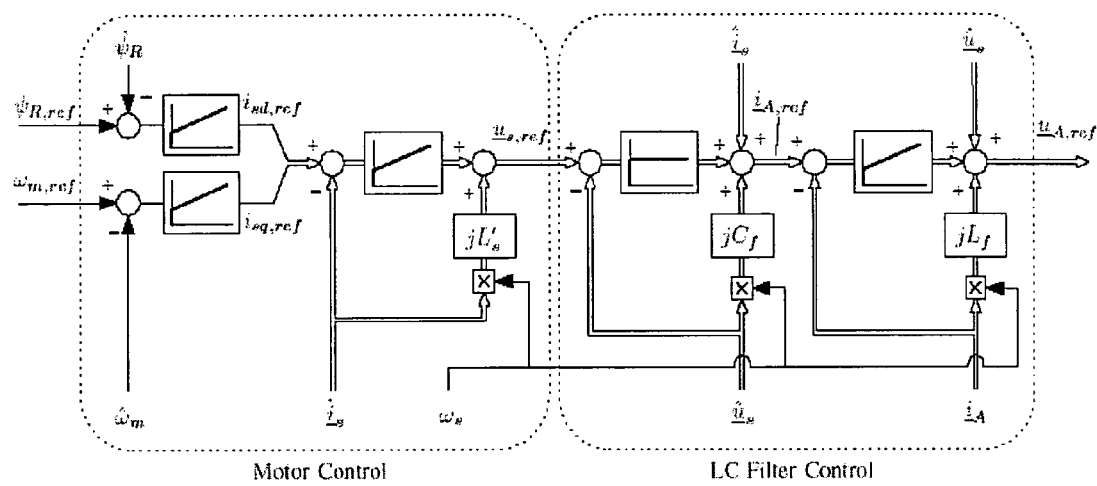
FIG. 2 is an exemplary signal flow diagram of the cascade control.

FIG. 2 illustrates the proposed cascade control of the system in the estimated rotor flux reference frame. In the LC filter control, the innermost control loop governs the inverter current $i_A$ by means of a PI controller, and the stator voltage $u_s$ is governed by a P-type controller in the next control loop. In both control loops, decoupling terms are used to compensate the cross-couplings caused by the rotating reference frame.

The motor control forms the two outermost control loops. The stator current $i_s$ is controlled by a PI-type controller with cross-coupling compensation, and the rotor speed is governed by a PI-controller. In addition, a PI-type rotor flux controller is used. It should be noted, however, that the presented control system is provided only as an example.

C. Adaptive Full-Order Observer

The system states are estimated by means of a full-order observer. The electrical angular speed of the rotor, included in the state space representation (7), is estimated using an adaptation mechanism. The observer is implemented in the estimated rotor flux reference frame, i.e., in a reference frame where $\hat{\psi}_R = \hat{\psi}_R + j0$. The observer is given as $$\dot{\hat{x}} = \hat{A}\hat{x} + Bu_A + K(i_A - \hat{i}_A) \quad (9)$$

The system matrix and the observer gain vector in (9) are $$\hat{A} = \begin{bmatrix} -\frac{R_{Lf}}{L_f} - j\omega_s & -\frac{1}{L_f} & 0 & 0 \\ \frac{1}{C_f} & -j\omega_s & -\frac{1}{C_f} & 0 \\ 0 & \frac{1}{L'_s} & -\frac{1}{\tau'_\sigma} - j\omega_s & \frac{1}{L'_s}\left(\frac{1}{\tau_r} - j\hat{\omega}_m\right) \\ 0 & 0 & R_R & -\frac{1}{\tau_r} - j(\omega_s - \hat{\omega}_m) \end{bmatrix} \quad (10)$$

$$K = [k_1\ k_2\ k_3\ k_4]^T \quad (11)$$

where the estimated states are marked by the symbol '^'.

The conventional speed adaptation law for the induction motor [7] is modified for the case where an LC filter is used. The estimation error of the inverter current is used for the speed adaptation, instead of the estimation error of the stator current as in the prior art systems. In order to stabilize the regeneration mode at low speeds, the idea of a rotated current estimation error [9], [11] is adopted.

The speed-adaptation law in the estimated rotor flux reference frame is $$\hat{\omega}_m = -K_p Im\{(i_A - \hat{i}_A)e^{-j\phi}\} - K_i \int Im\{(i_A - \hat{i}_A)e^{-j\phi}\}dt \quad (12)$$

where $K_p$ and $K_i$ are real adaptation gains, and the angle $\phi$ changes the direction of the error projection. The digital implementation of the adaptive full-order observer is based on a simple symmetric Euler method [12].

According to the method of the invention, the inverter output current vector $i_A$ and the inverter output voltage vector $u_A$ are determined. These determinations are normal current and voltage measurements. In a practice, the inverter output voltage vector $u_A$ is replaced in equation (9) by its reference $u_{A,ref}$. Typically only two phase currents are measured to obtain the current vector. The output voltage of the inverter can be determined together from information of the states of the output switches and from voltage of the intermediate circuit.

Method of the invention further comprises a step of forming a full-order observer having a system matrix $\underline{\hat{A}}$ and gain vector $\underline{K}$ as explained above. The observer produces the estimated rotor flux linkage vector $\hat{\psi}_R$, the estimated stator current vector $\hat{\underline{i}}_s$, the estimated stator voltage vector $\hat{\underline{u}}_s$ and the estimated inverter output current vector $\hat{\underline{i}}_A$. These estimates can be used in the motor control in normal manner.

Since the inverter output current is both estimated and determined, the difference of them can be used in a speed adaptation loop, which produces an estimate for the electrical angular speed $\hat{\omega}_m$ of the induction machine. Basically the speed adaptation law corrects the estimate of the angular speed so that the determined and estimated current vectors are similar.

Surprisingly the q components of estimated stator current vector and inverter output current vector are almost identical, which makes it possible to use the inverter output current instead of stator current in the speed adaptation as explained later.

With the method of the invention, all required information is gathered in order to control the induction machine.

Steady-State Analysis

The dynamics of the estimation error $\tilde{\underline{x}} = \underline{x} - \hat{\underline{x}}$ is obtained from (7) and (9):

$$\dot{\tilde{\underline{x}}} = (\underline{A} - \underline{K}\underline{C})\tilde{\underline{x}} + (\underline{A} - \underline{\hat{A}})\hat{\underline{x}} \quad (13)$$

where the difference between system matrices is $$\underline{A} - \underline{\hat{A}} = \underbrace{\begin{bmatrix} 0 & 0 & 0 & 0 \\ 0 & 0 & 0 & 0 \\ 0 & 0 & 0 & -j\frac{1}{L'_s} \\ 0 & 0 & 0 & j \end{bmatrix}}_{M}(\omega_m - \hat{\omega}_m) \quad (14)$$

For the steady-state analysis, the derivative of estimation error (13) is set to zero. The operation point is determined by the synchronous angular frequency $\omega_s$, the slip angular frequency $\omega_r = \omega_s - \omega_m$, and the estimated rotor flux $\hat{\psi}_R$. The example values of a 2.2-kW four-pole induction motor (400 V, 50 Hz), shown in Table I, were used for the following analysis.

Figure 3:
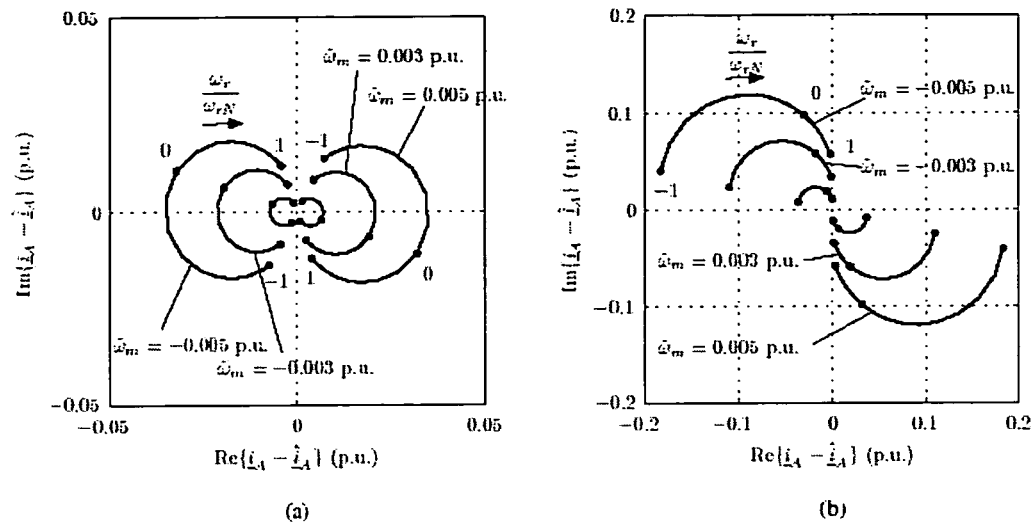
FIGS. 3a, 3b and 4 show loci of a current estimation error.

FIG. 3 illustrates the current estimation error as the slip is varied from the negative rated slip to the positive rated slip, for various values of the rotor speed estimation error $\tilde{\omega}_m = \omega_m - \hat{\omega}_m$ between -0.005 p.u. and 0.005 p.u. The estimated rotor flux is constant and the synchronous frequency $\omega_s$ is 0.1 p.u. in FIG. 3a and 0.8 p.u. in FIG. 3b. The observer gain is $\underline{K} = [3000 s^{-1} \ 0 \ 0 \ 0]^T$, and the base value of the angular frequency is $2\pi 50$ rad/s, and the rated slip frequency is $\omega_{rN} = 0.05$ p.u.

If the angle correction is not used in the adaptation law (12), the rotor speed estimate is calculated according to the imaginary part of the current estimation error. This kind of adaptation law works well in the motoring mode (where $\omega_s \omega_r > 0$), but at low synchronous speeds in the regeneration mode ($\omega_s \omega_r < 0$), the imaginary part of the current estimation error changes its sign at a certain slip angular frequency as can be seen in FIG. 3(a). Beyond this point, the estimated rotor speed is corrected to the wrong direction, leading to unstable operation. This problem is not encountered at high synchronous speeds, as can be seen in FIG. 3(b).

The unstable operation can be avoided if the real part of the current estimation error is also taken into account in the speed adaptation. Correspondingly, the current estimation error is rotated by a factor $e^{-j\phi}$. The angle $\phi$ is selected as [9]

$$\phi = \begin{cases} \phi_{max} \ \text{sign}(\omega_s)\left(1 - \frac{|\omega_s|}{\omega_\phi}\right) & \text{if } |\omega_s| < \omega_\phi \text{ and } \omega_s \hat{\omega}_r < 0 \\ 0 & \text{otherwise} \end{cases} \quad (15)$$

where $\phi_{max}$ is the maximum correction angle and $\omega_\phi$ is the limit for the synchronous angular frequency after which the correction is not used.

Figure 4:
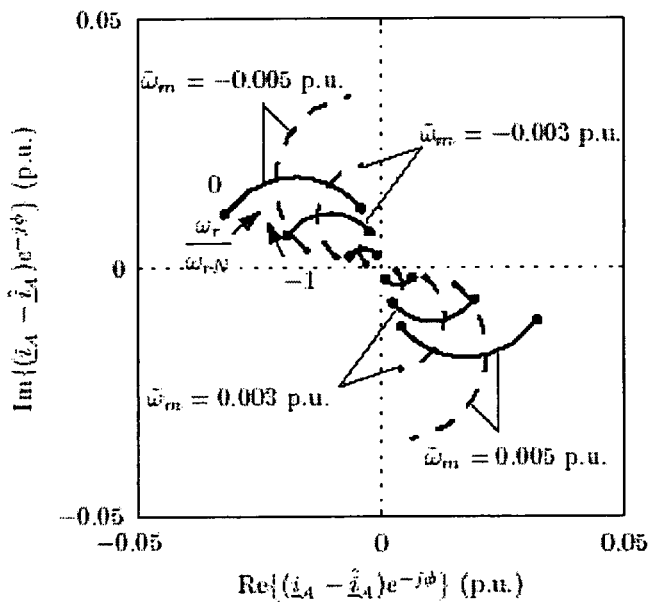

The influence of the angle correction is shown in FIG. 4. The parameter values $\phi_{max} = 0.467$ and $\omega_\phi = 0.75$ p.u. are used in this example. In the regeneration-mode operation, the current error vector is rotated clockwise and the estimated rotor speed is corrected to the right direction.

FIG. 4 shows loci of current estimation error as slip varies from negative rated slip to positive rated slip for various rotor speed estimation error values between -0.005 p.u. and 0.005 p.u. The synchronous angular frequency 0.1 p.u. The current error is rotated at negative slip angular frequencies (dashed curves).

Dynamic Analysis

The dynamic behavior of the speed-adaptive observer can be analyzed via linearization. The operating point is set by the equilibrium quantities: the rotor angular speed $\omega_{m0}$ and the synchronous angular frequency $\omega_{s0}$, and the rotor flux $\psi_{R0}$. The linearized estimation error is $$\dot{\tilde{\underline{x}}} = (\underline{A}_0 - \underline{K}\underline{C})\tilde{\underline{x}} + \underline{M}\underline{x}_0(\omega_m - \hat{\omega}_m) \quad (16)$$

The transfer function from the speed estimation error to the inverter current estimation error obtained from (16) is $$\underline{G}(s) = \frac{\underline{i}_A(s) - \hat{\underline{i}}_A(s)}{\omega_m(s) - \hat{\omega}_m(s)} = \underline{C}(s\underline{I} - \underline{A}_0 + \underline{K}\underline{C})^{-1}\underline{M}\underline{x}_o \quad (17)$$

Based on (12), the transfer function from the imaginary part of the rotated inverter current error, $\text{Im}\{(\underline{i}_A - \hat{\underline{i}}_A)e^{-j\phi}\}$, to the speed estimate, $\hat{\omega}_m$, is $$K(s) = -K_p - \frac{K_i}{s} \quad (18)$$

Figure 5:
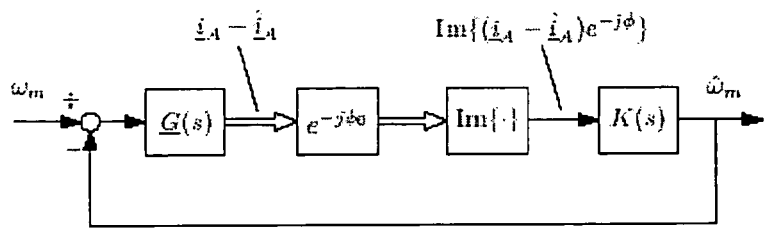
FIG. 5 is an exemplary signal flow diagram of linearized model.

The resulting linearized system model for dynamic analysis is shown in FIG. 5. This model is used for investigating the pole locations of the linearized system at different operating points.

Figure 6:
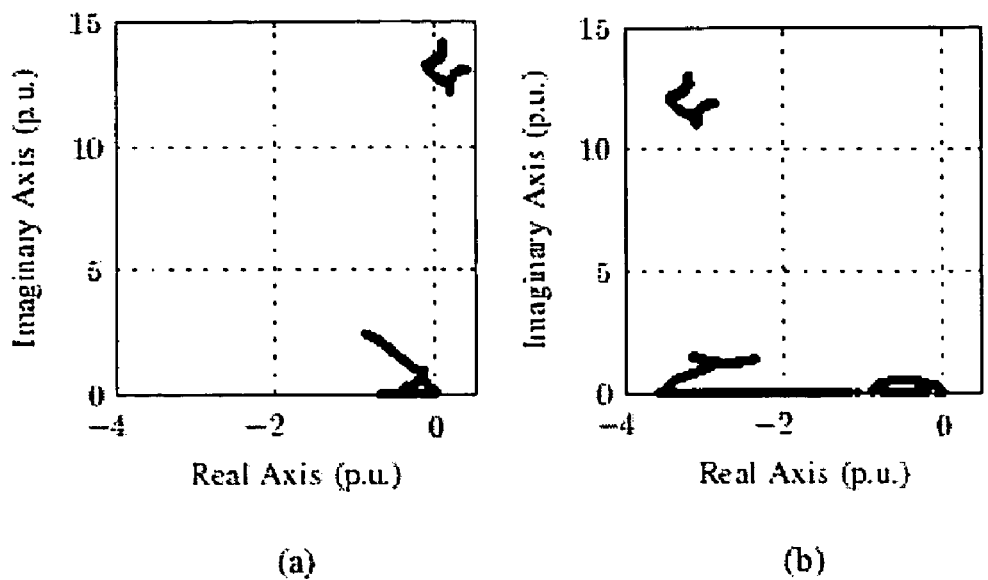
FIGS. 6a and 6b show observer poles.

The observer gain $\underline{K}$ affects the stability of the system. In an induction motor drive without an LC filter, the adaptive observer is stable in the motoring mode even with zero gain [8]. However, zero gain cannot be used when an LC filter is present. FIG. 6(a) shows the observer poles as the synchronous angular frequency $\omega_s$ is varied from -1 p.u. to 1 p.u. and the slip is rated. The adaptive observer with zero gain is unstable in the motoring mode, corresponding to the poles in the right half-plane.

In order to obtain a simple observer structure, the observer gain $$\underline{K} = [k, \ 0 \ 0 \ 0]^T \quad (19)$$

is proposed. The poles obtained are shown in FIG. 6(b). All poles stay in the left half-plane in the whole inspected operation region.

Simulation Results

The system was investigated by computer simulation with Matlab/Simulink software. The data of a 2.2-kW induction motor, given in Table I, were used for the simulations. The LC filter was designed according to the design rules in [13], [14]. The sampling frequency was equal to the switching frequency of 5 kHz. The bandwidths of the controllers were 500 Hz for the inverter current, 250 Hz for the stator voltage, 150 Hz for the stator current, 15 Hz for the rotor speed, and 1.5 Hz for the rotor flux. The speed estimate was filtered using a low-pass filter having the bandwidth of 40 Hz. The reference voltage $\underline{u}_{A,ref}$ was used in the observer instead of the actual inverter output voltage $\underline{u}_A$. The observer gain was $\underline{K}=[3000s^{-1}\ 0\ 0\ 0]^T$, and the adaptation gains were chosen as $K_p=10(As)^{-1}$ and $K_i=20000\ (As^2)^{-1}$.

Figure 7:
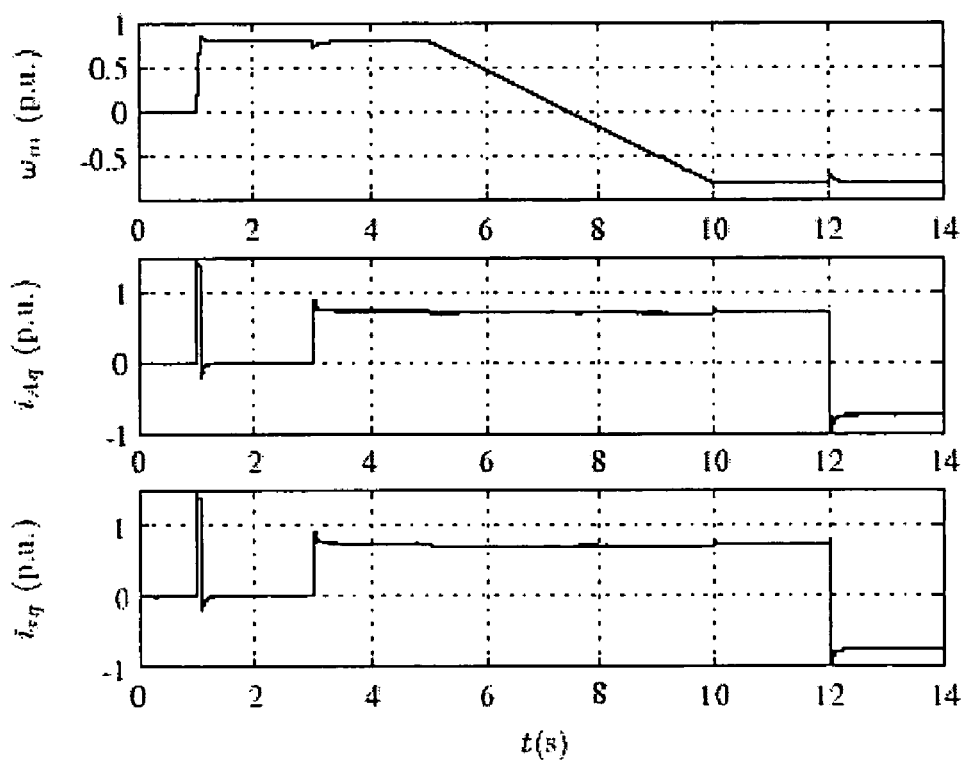
FIG. 7 represents an exemplary simulation result.

FIG. 7 shows simulation results obtained for a sequence consisting of a fast acceleration from zero speed to 0.8 p.u., a rated load step, a slow speed reversal, and a stepwise load reversal to the negative rated load. The motor was in the regenerating mode between t=7.6 s and t=12 s. During the rest of the sequence, the motor was in the motoring mode with the exception of a short time in the plugging mode during the speed reversal. The first subplot shows the rotor speed (solid) and its estimate (dashed). The second subplot shows the q component of the inverter current (solid) and its estimate (dashed). The third subplot shows the q component of the stator current (solid) and its estimate (dashed). It should be noted, that the solid and dashed plots are similar, meaning that the estimates are accurate.

Figure 8:
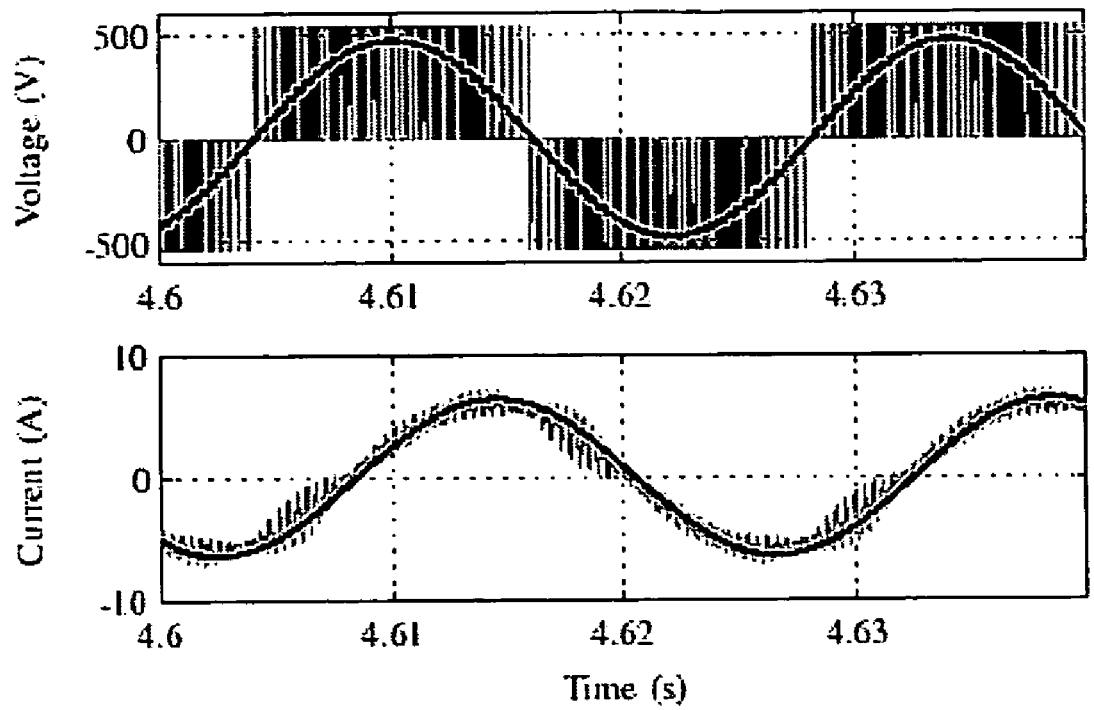
FIG. 8 shows voltage and current waveforms from the simulation of FIG. 7.

Slow speed reversals at load are difficult for sensorless induction motor drives. Although the exact motor and filter parameters are used in the simulation, small vibrations appear in $i_{Aq}$ and $i_{sq}$ at t=7.8 s when the synchronous frequency is zero. More problems are encountered if slower speed reversals are needed or parameter estimates are inaccurate. It is to be noted that the q components of the inverter and stator currents are nearly equal, which makes it possible to use $i_{Aq}$ in the speed adaptation law instead of $i_{sq}$ as in the prior art systems. The voltage and current waveforms before and after the LC filter are illustrated in detail in FIG. 8. The stator voltage and current are nearly sinusoidal. The first subplot shows the inverter output voltage (phase-to-phase) and the stator voltage (phase-to-phase). The second subplot shows the inverter current and the stator current.

EXPERIMENTAL RESULTS

Figure 9:
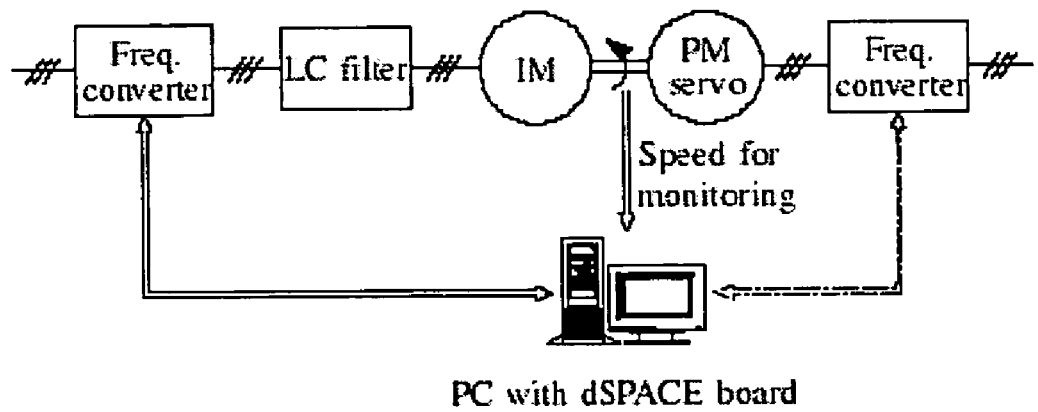
FIG. 9 shows the exemplary experimental setup.

The experimental setup is illustrated in FIG. 9. The 2.2-kW four-pole induction motor was fed by a frequency converter controlled by a dSPACE DS1103 PPC/DSP board. The parameters of the experimental setup correspond to those given in Table I. In the LC filter three 3.3-μF capacitors were used in delta connection, giving the per-phase capacitance value of 9.9 μF. The dc-link voltage was measured, and the reference voltage obtained from the inverter current controller was used for the observer. The rotor speed and the shaft torque were measured only for monitoring. A simple current feedforward compensation for dead times and power device voltage drops was applied [15]. A permanent magnet servo motor was used as a load machine.

Figure 10:
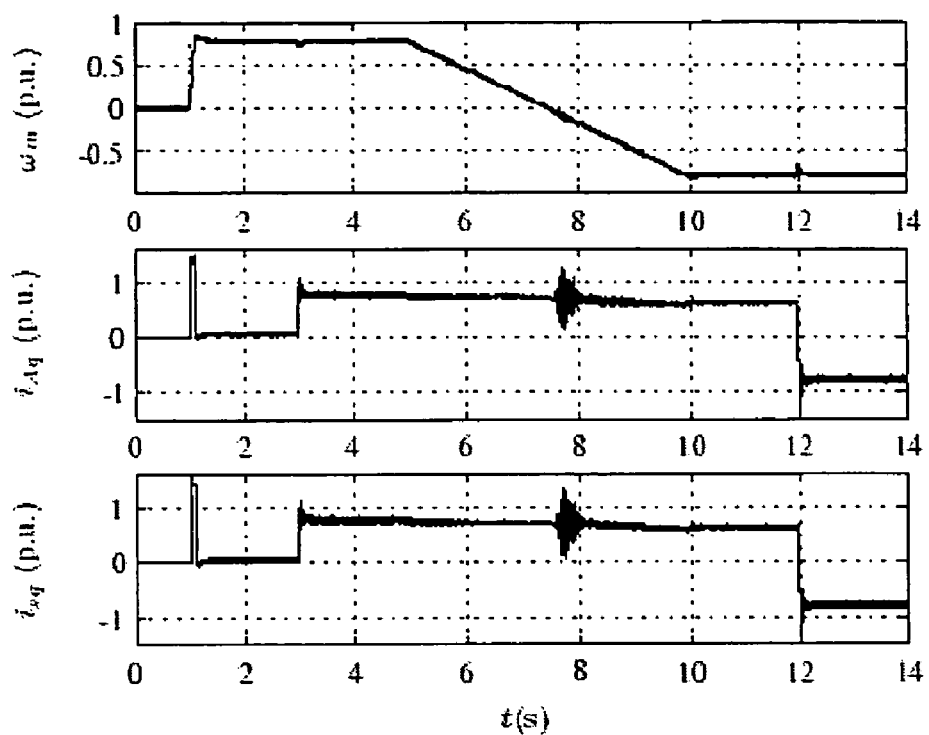
FIGS. 10 and 11 represent exemplary experimental results.

FIG. 10 presents the experimental results corresponding to the simulations shown in FIG. 7. The measured performance corresponds well to the simulation results, but the vibrations in $i_{Aq}$ and $i_{sq}$ are pronounced at zero synchronous frequency. The vibrations are due to inaccurate motor parameter estimates and inverter nonidealities. The explanations of FIG. 10 are as in FIG. 7.

The vibration can be attenuated by lowering the observer gain at low speeds. The observer gain is selected as $$k_1 = \begin{cases} k_{1l} + \dfrac{k_{1h}-k_{1l}}{\omega_d}|\hat{\omega}_m| & \text{if } |\hat{\omega}_m| < \omega_d \\ k_{1h} & \text{otherwise} \end{cases} \quad (20)$$

where $k_{1l}$ and $k_{1h}$ are the minimum and the maximum gains. The speed limit after which the maximum gain is used is $\omega_d$. The limit angular frequencies $\omega_\phi$ for the angle correction in (15) must also be changed because of the lower gain at low speeds. In order to avoid stepwise changes, the limit is selected as $$\omega_\phi = \begin{cases} \omega_{\phi l} + \dfrac{\omega_{\phi h}-\omega_{\phi l}}{\omega_d}|\hat{\omega}_m| & \text{if } |\hat{\omega}_m| < \omega_d \\ \omega_{\phi h} & \text{otherwise} \end{cases} \quad (21)$$

where $\omega_{\phi l}$ and $\omega_{\phi h}$ are the limit angular frequencies for the angle correction at low and high speeds, respectively.

Figure 11:
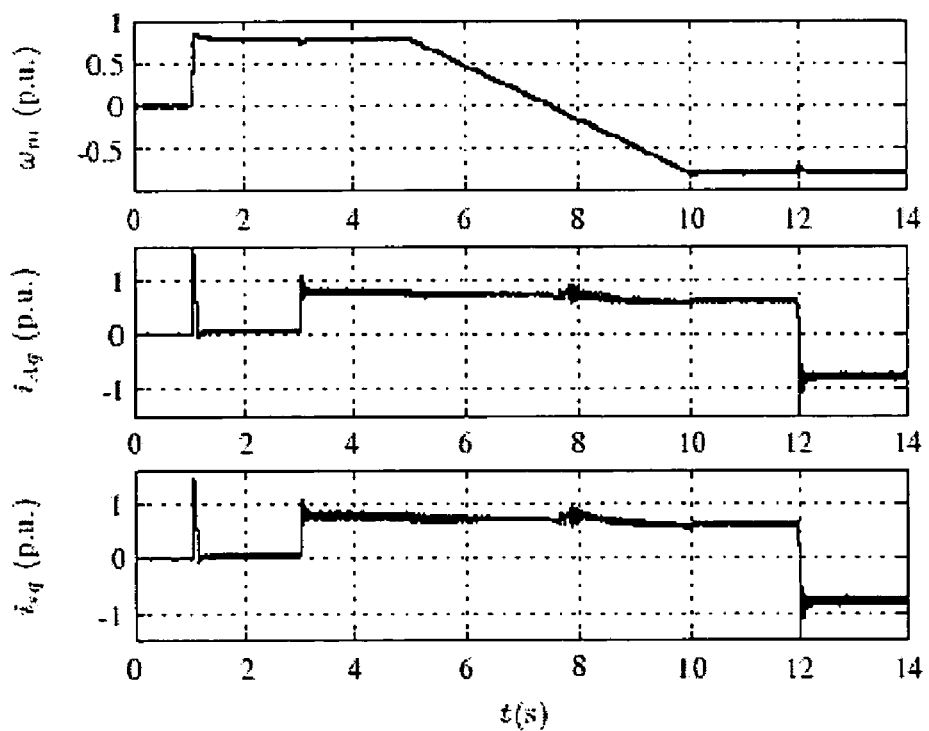

Experimental results obtained for the modified observer gain and angle correction are shown in FIG. 11. The parameters in (20) and (21) were $k_{1l}=1000\ s^{-1}$, $k_{1h}=3000\ s^{-1}$, $\omega_{\phi l}=0.4$ p.u., $\omega_{\phi h}=0.75$ p.u., and $\omega_d=0.38$ p.u. The explanations of FIG. 11 are as in FIG. 7.

The vibrations at the zero synchronous speed are reduced significantly, but not totally removed.

It should be noted, that the described control system is only one possible system for controlling an induction machine based on the method of the invention. It will be obvious to a person skilled in the art that, as the technology advances, the inventive concept can be implemented in various ways. The invention and its embodiments are not limited to the examples described above but may vary within the scope of the claims.

TABLE I

PARAMETERS OF THE MOTOR AND THE LC FILTER

| Motor Parameters | |
| --- | --- |
| Stator resistance $R_S$ | 3.67 Ω |
| Rotor resistance $R_R$ | 1.65 Ω |
| Stator transient inductance $L'_S$ | 0.0209 H |
| Magnetizing inductance $L_M$ | 0.264 H |
| Total moment of inertia J | 0.0155 kgm² |
| Rated speed $n_N$ | 1430 r/min |
| Rated (base) current $I_N$ | 5.0 A |
| Rated torque $T_N$ | 14.6 Nm |
| LC Filter Parameters | |
| Inductance $L_f$ | 8 mH |
| Capacitance $C_f$ | 9.9 μF |
| Series resistance $R_{Lf}$ | 0.1 Ω |

REFERENCES

[1] D. F. Busse, J. M. Erdman, R. J. Kerkman, D. W. Schlegel, and G. L. Skibinski, "The effects of PWM voltage source inverters on the mechanical performance of rolling bearings," *IEEE Trans. Ind. Applicat.*, vol. 33, March/April 1997, pp. 567–576.

[2] A. von Jouanne, P. Enjeti, and W. Gray, "The effect of long motor leads on PWM inverter fed AC motor drive systems," in *Proc. IEEE APEC*, vol. 2, Dallas, Tex., March 1995, pp. 592–597.

[3] M. Kojima, K. Hirabayashi, Y. Kawabata, E. C. Ejiogu, and T. Kawabata, "Novel vector control system using deadbeat-controlled PWM inverter with output LC filter," *IEEE Trans. Ind. Applicat.* vol. 40, January/February 2004, pp. 162–169.

[4] A. Nabae, H. Nakano, and Y. Okamura, "A novel control strategy of the inverter with sinusoidal voltage and current outputs," in *Proc. IEEE PESC'94*, vol. 1, Taipei, Taiwan, June 1994, pp. 154–159.

[5] R. Seliga and W. Koczara, "Multiloop feedback control strategy in sinewave voltage inverter for an adjustable speed cage induction motor drive system," in *Proc. EPE 2001*, Graz, Austria, August 2001, CD-ROM.

[6] J. Salomaki and J. Luomi, "Vector control of an induction motor fed by a PWM inverter with output LC filter," in *Proc. NORPIE/12004*, Trondheim, Norway, June 2004, CD-ROM.

[7] H. Kubota, K. Matsuse, and T. Nakano, "DSP-based speed adaptive flux observer of induction motor," *IEEE Trans. Ind. Applicat.*, vol. 29, March/April 1993, pp. 344–348.

[8] H. Kubota, I. Sato, Y. Tamura, K. Matsuse, H. Ohta and Y. Hori, "Regenerating-mode low-speed operation of sensorless induction motor drive with adaptive observer," *IEEE Trans. Ind. Applicat.*, vol. 38, July/August 2002, pp. 1081–1086.

[9] M. Hinkkanen and J. Luomi, "Stabilization of the regenerating mode of full-order flux observers for sensorless induction motors," in *Proc. IEEE IEMDC'03*, Madison, Wis., June 2003.

[10] G. R. Slemon, "Modelling of induction machines for electric drives," *IEEE Trans. Ind. Applicat.*, vol. 25, November/December 1989, pp. 1126–1131.

[11] M. Hasegawa and K. Matsui, "Robust adaptive full-order observer design with novel adaptive scheme for speed sensorless vector controlled induction motors," in *Proc. IEEE IECON '02*, Sevilla, Spain, November 2002.

[12] J. Niiranen, "Fast and accurate symmetric Euler algorithm for electromechanical simulations," in *Proc. Electrimacs'99*, Lisboa, Portugal, September 1999, pp. 71–78.

[13] J. Steinke, C. Stulz, and P. Pohjalainen, "Use of a LC filter to achieve a motor friendly performance of the PWM voltage source inverter," in *Proc. IEEE IEMDC'97*, Milwaukee, Wis., May 1997, pp. TA2/4.1–TA2/4.3.

[14] C. Xiyou, Y. Bin, and G. Yu, "The engineering design and the optimization of inverter output RLC filter in AC motor drive system," in *Proc. IEEE IECON'02*, vol. 1, Sevilla, Spain, November 2002, pp. 175–180.

[15] J. K. Pedersen, F. Blaabjerg, J. W. Jensen, and P. Thogersen, "An ideal PWM-VSI inverter with feedforward and feedback compensation," in *Proc. EPE'93*, vol. 4, Brighton, U.K., September 1993, pp. 312–318.

The invention claimed is:

1. A method of controlling of an induction machine using an inverter with an output LC filter, comprising:
    determining an inverter output current vector ($\underline{i}_A$)
    determining an inverter output voltage vector ($\underline{u}_A$),
    forming a full-order observer having a system matrix ($\hat{\underline{A}}$) and gain vector ($\underline{K}$), the observer producing an estimated rotor flux linkage vector ($\hat{\psi}_R$), an estimated stator current vector ($\hat{i}_s$), an estimated stator voltage vector ($\hat{u}_s$) and an estimated inverter output current vector ($\hat{i}_A$)
    determining an estimation error ($\underline{i}_A - \hat{i}_A$) of the inverter output current vector,
    forming a speed adaptation law based on the estimation error of the inverter output current vector for determining an estimate for electrical angular speed ($\hat{\omega}_m$) of the induction machine, and
    controlling the induction machine based on at least one of the estimated rotor flux linkage vector, estimated stator current vector, estimated stator voltage vector and estimated inverter output current vector and a measured inverter output current.

2. A method according to claim 1, comprising:
    defining a correction angle ($\phi$) and
    changing a direction of the estimation error ($\underline{i}_A - \hat{i}_A$) according to the correction angle ($\phi$) before forming the speed adaptation law to keep the observer stable in a regenerating mode.

3. A method according to claim 1, wherein determining of the inverter output voltage vector ($\underline{u}_A$) comprises:
    using an inverter output voltage reference $\underline{u}_{A,ref}$.

4. A method according to claim 1, wherein the controlling is based on the estimated rotor flux linkage vector, estimated stator current vector, estimated stator voltage vector and estimated inverter output current vector.

* * * * *